United States Patent [19]

Wulf

[11] 4,291,921
[45] Sep. 29, 1981

[54] HUB CAP FOR VEHICLE WHEELS

[76] Inventor: Hurst E. Wulf, 625 Middlesex Blvd., Grosse Pointe Park, Mich. 48230

[21] Appl. No.: 53,902

[22] Filed: Jul. 2, 1979

[51] Int. Cl.³ .............................................. B60B 7/06
[52] U.S. Cl. ............................ 301/37 AT; 301/108 R
[58] Field of Search ...................... 220/232, 239, 240; 285/97, 104, 105, 109; 301/37 R, 37 AT, 37 B, 108 R; 403/5

[56] References Cited

U.S. PATENT DOCUMENTS

| 658,588 | 9/1900 | Reynolds et al. | 301/37 R |
| 2,007,916 | 7/1935 | Kastner | 301/37 AT |
| 2,463,235 | 3/1949 | Andrews | 285/105 |
| 2,697,534 | 12/1954 | Topley | 285/97 |
| 3,788,651 | 1/1974 | Brown et al. | 220/232 |

FOREIGN PATENT DOCUMENTS 629134 9/1949 United Kingdom ................. 301/37

Primary Examiner—H. Grant Skaggs
Attorney, Agent, or Firm—Adolph G. Martin

[57] ABSTRACT

A vehicle wheel hub cap having a stylized disk with a pair of spaced openings therein adjacent the outer periphery. An outstanding collar on the disk supports thereon an inflatable tube. A flared retainer rim on the outstanding collar holds the inflatable tube in its assigned position on the collar. An outwardly disposed valve stem on the inflatable tube is aligned with one of the spaced openings in the disk. A removable plug in the opening aligned with the valve stem is adapted to enter into a locking engagement with the disk. The inflatable tube when pressurized expands so as to holdably engage the rim of a conventional vehicle wheel. The hub cap is thus secured against accidental loss or theft, and can be removed only after the inflatable tube has been depressurized.

17 Claims, 15 Drawing Figures

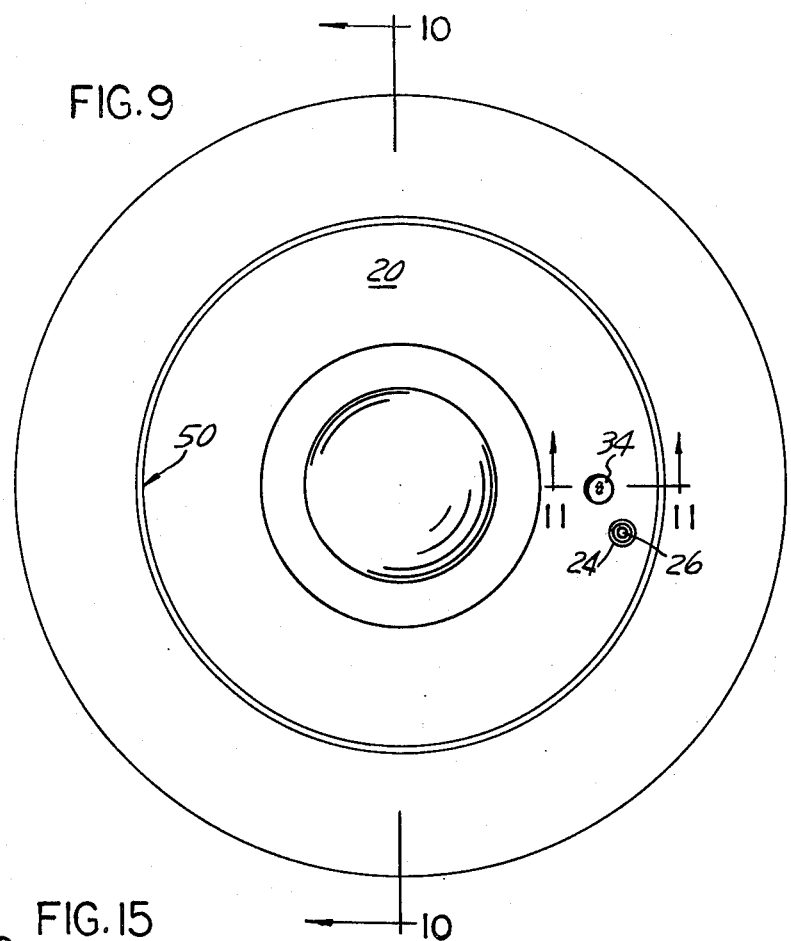
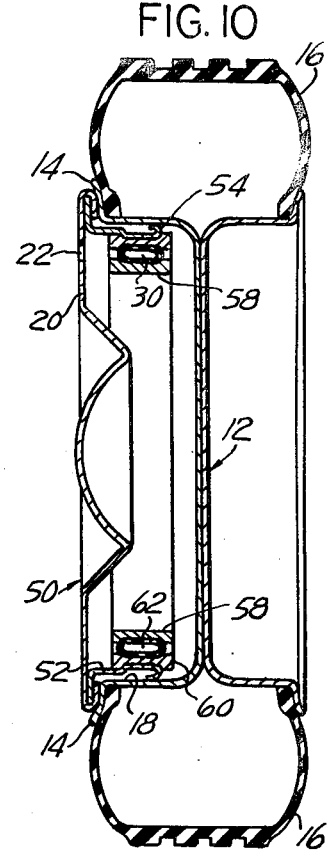
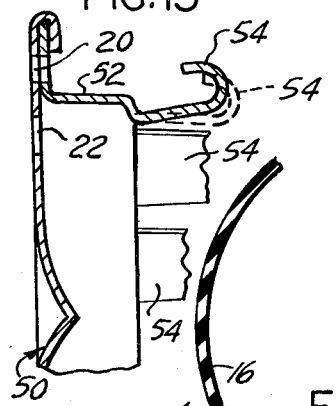
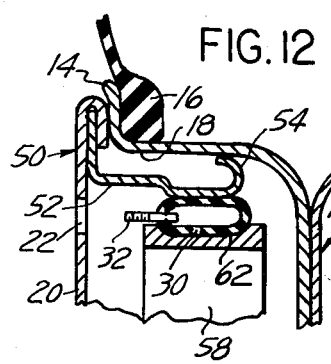
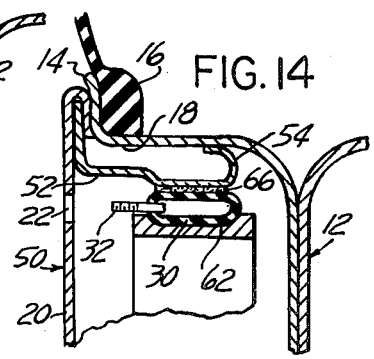
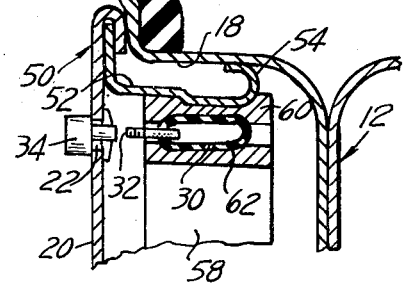
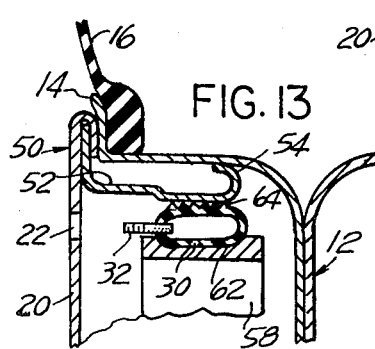

HUB CAP FOR VEHICLE WHEELS

BACKGROUND OF THE INVENTION

This invention relates to hub caps generally, but more particularly to stylized covers for the wheels on motor vehicles. Wheel covers presently in use have a series of resilient clips which holdably engage the rim on the vehicle wheel as they are driven inwardly by striking the outer face of the cover. Unless care is exercised in the selection of a proper tool, the cover can be damaged and the surface marred in the course of removing and applying it to the vehicle wheel.

Furthermore, the resilient clips scrape paint from the wheel rim every time the cover is removed and replaced. Such loss of paint exposes the metal to moisture, thus causing the wheel rims to rust, which eventually produces discoloration of the sidewalls on the vehicle tires. Conventional wheel covers are also always vulnerable to theft and accidental loss resulting from sudden stress and shock produced by pot holes and other irregularities in the driving surface.

Fully cognizant of these shortcommings in conventional wheel covers, the applicant has conceived and developed a cover for vehicle wheels which can be removed and applied indefinitely without any damage to the gripping surface of the wheel rims. Furthermore, loss of the applicant's wheel cover by accident is virtually impossible, and any attempt by thieves to remove the cover without first de-pressurizing the inflatable tube would result in severe damage to or complete destruction of the wheel cover.

Therefore, since accidental deflation of the tube is a very remote possibility, and the valve stem is not accessible for deliberate deflation by thieves, it is readily apparent that the applicant's wheel cover is highly invulnerable to loss either by accident or theft. The applicant's wheel cover is thus accordingly considered to constitute a significant contribution to the related art.

SUMMARY OF THE INVENTION

This invention consists of a stylized disk 20 having a pair of spaced openings 22 and 24 adjacent the outer periphery. An outstanding collar 28 on the disk 20 has thereon a flared retainer rim 29. An inflatable tube 30, supported on the outstanding collar 28, has an outwardly disposed valve stem 32 aligned with one of the spaced openings 22 in the stylized disk 20. A removable plug 34 in the opening 22, aligned with the valve stem 32, is adapted to enter into a locking engagement with the stylized disk 20.

DESCRIPTION OF THE DRAWINGS

FIG. 9 is a side elevation view, showing a hub cap 10 embodying a modification of the applicant's invention, attached to a conventional vehicle wheel 12.

FIG. 10 is a section view, taken substantially on plane 10—10 in FIG. 9, showing structural details of the invention.

FIG. 11 is an enlarged section view, taken substantially on plane 11—11 in FIG. 9, showing the valve stem 32 on the inflatable tube 30, and the removable plug 34 locked in the access opening 22 of the hub cap 50.

FIG. 12 is an enlarged section view, similar to FIG. 11, with the flexible ring 60 eliminated.

FIG. 13 is an enlarged section view, similar to FIG. 12, showing the spaced ribs 64 on the outer periphery of the inflatable tube 30.

FIG. 14 is an enlarged section view, similar to FIG. 12, showing the abrasive strip 66 on the outer periphery of the inflatable tube 30.

FIG. 15 is an enlarged fragmentary section view of a conventional hub cap 50, showing the modifications required to adapt it for use with the applicant's invention.

CONSTRUCTION

Figure 1:
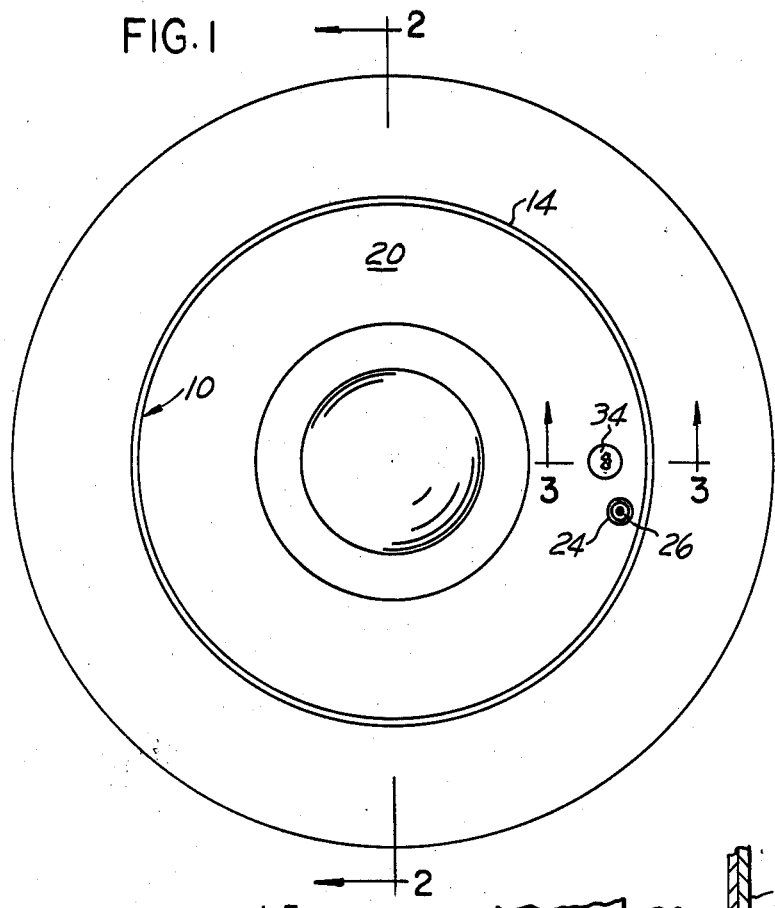
FIG. 1 is a side elevation view showing the applicant's hub cap 10 attached to a conventional vehicle wheel 12.
Figure 2:
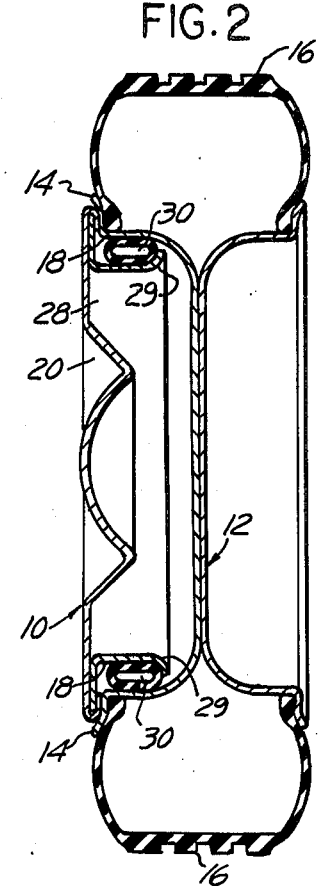
FIG. 2 is a section view, taken substantially on plane 2—2 in FIG. 1, showing structural details of the hub cap 10 constituting the preferred embodiment of the applicant's invention.

For a more detailed description of the invention, reference is made to FIGS. 1 through 8 of the drawings, in which numeral 10 designates generally the applicant's hub cap applied to a conventional vehicle wheel 12 with a rim 14 having thereon a pneumatic tire 16 and an inwardly disposed annular surface 18. The hub cap 10 comprises a stylized disk 20 having therein an access opening 22, and a conventional opening 24 to receive a standard valve stem assembly 26 for the pneumatic tire 16.

Figure 4:
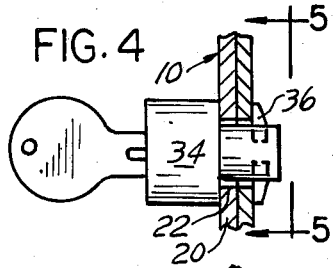
FIG. 4 is a greatly enlarged side elevation view of the removable plug 34, with most of the hub cap 10 torn away, showing structural details of the plug 34.
Figure 5:
FIG. 5 is an end elevation view, taken substantially on plane 5—5 in FIG. 4, showing the access opening 22 in the hub cap 10 and the shape of the several components of the removable plug 34.
Figure 3:
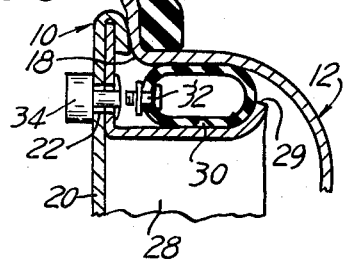
FIG. 3 is an enlarged section view, taken substantially on plane 3—3 in FIG. 1, showing the valve stem 32 on the inflatable tube 30, and the removable plug 34 locked in the access opening 22 of the hub cap 10.

A concentric outstanding circular collar 28, having thereon a flared retainer rim 29, is provided on the inner surface of the stylized disk 20. An inflatable tube 30, with a conventional valve stem 32, aligned with the access opening 22 in the stylized disk 20, is supported on the outstanding circular collar 28. A key operated removable plug 34, having a pair of spring loaded detents 36, as shown in FIGS. 3, 4 and 5, is locked in the access opening 22 of the stylized disk 20.

Figure 7:
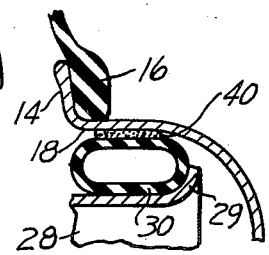
FIG. 7 is an enlarged section view, similar to FIG. 3, showing the spaced ribs 38 on the outer periphery of the inflatable tube 30.
Figure 8:
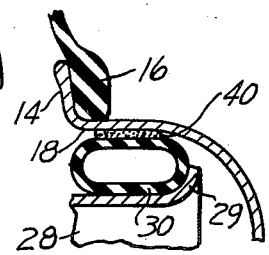
FIG. 8 is an enlarged section view, similiar to FIG. 3, showing the abrasive strip 40 on the outer periphery of the inflatable tube 30.

In practice, it may be deemed desirable to provide a series of spaced ribs 38 on the outer periphery of the inflatable tube 30, as shown in FIG. 7 of the drawings, to improve the gripping action between the tube 30 and the annular surface 18. It is also possible to use an abrasive strip 40 as a substitute for spaced ribs 38 on the outer periphery of the inflatable tube 30, as shown in FIG. 8 of the drawings, to insure an effective grip between the tube 30 and the annular surface 18.

This completes a discussion of the structural details relating to the preferred embodiment of the applicant's invention disclosed in FIGS. 1 through 8 of the drawings. The modification of the applicant's invention, shown in FIGS. 9 through 15 of the drawings, is intended primarily for use by service stations and garages in modifying conventional hub caps to provide the advantages inherent in the structure characterizing the preferred embodiment of the applicant's inventive concept.

A conventional hub cap 50, shown in FIG. 15 of the drawings, comprises a stylized disk 20 with an inwardly disposed concentric collar 52 having thereon a circular array of outstanding resilient members 54. Such conventional hub caps 50 must, however, be modified slightly to adapt them for use with the applicant's invention. An access opening 22 must be provided in the disk 20, adjacent the regular valve stem opening 24, and the outstanding resilient members 54 on the concentric collar 52 must be biased slightly inward to the broken line position 56, shown in FIG. 15.

A conventional hub cap 50, when modified in the manner described, is capable of receiving a pneumatic tube assembly unit consisting of an inflatable tube 30, a non-flexible ring 58 and a flexible or split ring 60. A standard valve assembly 32 is provided in the inflatable tube 30, a shown in FIG. 11 of the drawings. The non-flexible ring 58 has an annular recess 62 in the outer surface thereof in seating engagement with the inner periphery of the inflatable tube 30.

The flexible or split ring 60 has an annular recess in both the inner and outer surfaces thereof holdably seating respectively the inflatable tube 30 and the outstanding resilient members 54. The pneumatic tube assembly unit is oriented on the hub cap 50 so that the valve stem assembly 32 on the inflatable tube 30 is aligned with the access opening 22 in the stylized disk 20, as shown in FIGS. 10 and 11 of the drawings. A key operated removable plug 34, of the type shown in FIGS. 4 and 5, is locked in the access opening 22.

In practice, it may be deemed desirable to eliminate the flexible or split ring 60 in the pneumatic tube assembly unit, and provide either spaced ribs 64 or an abrasive strip 66 on the outer periphery of the inflatable tube 30, as shown in FIGS. 13 and 14 respectively of the drawings. The spaced ribs 64 or abrasive strip 66 will then bear directly on the inner surface of the outstanding resilient members 54 on the concentric collar 52.

The preceding discussion completes a description of the structural details of the two embodiments of the applicant's invention herein disclosed. However, to facilitate a more thorough understanding of the subject matter herein presented, a discussion of the manner in which the hub cap is used and operates to fulfill its intended function is immediately hereinafter set forth.

Since both embodiments of the applicant's invention operate in substantially the same manner, the discussion relating to use and operation will be confined to the preferred embodiment disclosed in FIGS. 1 through 8 of the drawings. In applying the applicant's hub cap 10 to a conventional vehicle wheel 12, the inflatable tube 30 is deflated sufficiently to permit the hub cap 10 to slide readily into position on the rim 14 of the vehicle wheel 12.

The inflatable tube 30 is then pressurized by any one of several means. If either a hand pump or a source of compressed air is available, a conventional extension, not here shown, can be threaded on the valve stem assembly 32 of the inflatable tube 30 so that it projects through the access opening 22 in the hub cap 10. When the inflatable tube 30 is pressurized sufficiently to bring it into a holding engagement with the inwardly disposed annular surface 18 on the rim 14, the extension is removed from the valve stem assembly 32.

The key operated removable plug 34, shown in FIGS. 4 and 5 of the drawings, is then inserted into the access opening 22 in the hub cap 10. An inwardly directed force of sufficient magnitude is applied to the removable plug 34 to bring the spring loaded detents 36 thereon into a locking engagement with the stylized disk 20. The valve stem assembly 32 on the inflatable tube 30 is thus rendered inaccessable, so that the inflatable tube 30 cannot be de-pressurized and the hub cap 10 removed by thieves or unauthorized persons.

Figure 6:
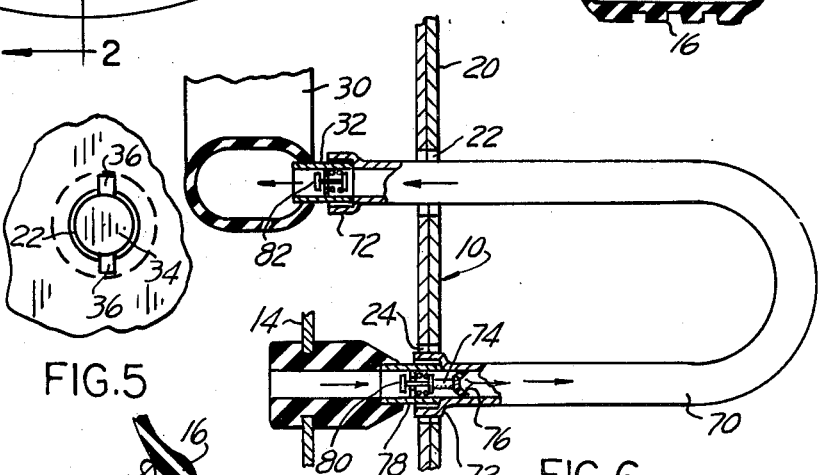
FIG. 6 is a side elevation view showing an implement for use in pressurizing the inflatable tube 30, with portions of the end sections on the implement torn away to show structural details.

If neither a hand pump nor a source of compressed air is available when it is desired to apply the hub cap 10 to a vehicle wheel 12, an implement of the type shown in FIG. 6 of the drawings can be employed. Such implement consists of a flexible tube 70, having on each end thereof, a cap 72 adapted to fit over a standard valve stem assembly 32. A valve depressor pin 74 is centrally supported in one of the end caps 72 by a perforated member 76 attached to or imbedded in the inner wall of the flexible tube 70.

By placing the end cap 72, containing the depressor pin 74, over the valve stem 78 of the vehicle tire 16 and applying an axial force of sufficient magnitude to unseat the valve 80 therein, pressurized air can be bled from the vehicle tire 16. If the cap 72, on the other end of the flexible tube 70 is simultaneously placed over the valve stem 32 on the inflatable tube 30, the pressurized air being bled from the vehicle tire 16 will unseat the valve 82 therein and pressurize the inflatable tube 30.

The inflatable tube 30 can thus be inflated to a pressure equal to that in the vehicle tire 16, without appreciably reducing the tire pressure. The 25 to 35 pounds per square inch pressure, customarily carried by vehicle tires, has been determined sufficient pressure to produce an effective gripping engagement between the inflatable tube 30 and the inwardly disposed annular surface 18 on the rim 14.

When it is desired to remove the hub cap 10 from the vehicle wheel 12, it is first necessary to unlock and withdraw the key operated removable plug 34 from the access opening 22 in the disk 20. The inflatable tube 30 is then depressurized by manually depressing the valve 82 in the valve stem assembly 32. The hub cap 10 can then be readily removed from the rim 14 of the vehicle wheel 12 without the use of a tool or any other mechanical device.

Based upon the foregoing discussion, the applicant is of the opinion that his invention has fulfilled a long-felt need in the field of vehicle hub caps, and that he has accordingly made a valuable contribution to the related art. However, while the invention has been described with reference to the structural details of a limited number of embodiments, it will be appreciated by those familiar with the art that the principles involved are susceptible of numerous other practical adaptations.

I therefore claim as new, and desire to secure by Letters Patent:

1. A hub cap for vehicle wheels having an inwardly disposed annular surface, such hub cap comprising a disk having therein an access opening, a circular array of outstanding resilient members on the inner surface of the disk, an inflatable tube disposed within the circular array of outstanding resilient members, a non-flexible ring around the inner periphery of the inflatable tube, means holding the non-flexible ring on the inflatable tube, and means for pressurizing the inflatable tube through the access opening in the disk so as to flex the outstanding resilient members and force them into a holding engagement with the inwardly disposed annular surface on the vehicle wheel.

2. The hub cap of claim 1 in which the means for pressurizing the inflatable tube consists of a valve stem assembly thereon aligned with the access opening in the disk.

3. The hub cap of claim 2 in which the means holding the non-flexible ring on the inflatable tube consists of an annular recess on the outer periphery of the non-flexible ring in seating engagement with the inflatable tube.

4. The hub cap of claim 3 having in addition thereto a flexible ring on the outer periphery of the inflatable tube, such flexible ring having an annular recess in both the inner and outer surfaces thereof holdably seating respectively the inflatable tube and the resilient members on the disk.

5. The hub cap of claim 2 having in addition thereto at least one outwardly disposed rib on the outer periphery of the inflatable tube.

6. The hub cap of claim 2 having in addition thereto an abrasive section on the outer periphery of the inflatable tube.

7. The hub cap of claim 1 having in addition thereto a removable plug in the access opening of the disk adapted to enter into a locking engagement with the disk.

8. A pneumatic tube assembly unit for use with vehicle hub caps having a disk with an inwardly disposed circular array of resilient members for gripping the vehicle wheel, such unit comprising an inflatable tube for flexing the resilient members, valve means on the inflatable tube for controlling the pressure therein, a non-flexible ring around the inner periphery of the inflatable tube and means holding the non-flexible ring on the inflatable tube.

9. The pneumatic tube assembly unit of claim 8 having in addition thereto a flexible ring around the outer periphery of the inflatable tube and means holding the flexible ring on the inflatable tube.

10. The pneumatic tube assembly unit of claim 9 in which the means holding the nonflexible ring on the inflatable tube consists of an annular recess in the outer surface of the non-flexible ring in seating engagement with the inflatable tube.

11. The pneumatic tube assembly unit of claim 10 in which the means holding the flexible ring on the inflatable tube consists of an annular recess on the inner surface of the flexible ring in seating engagement with the inflatable tube.

12. The pneumatic tube assembly unit of claim 11 having in addition thereto an annular recess in the outer surface of the flexible ring for holdably seating the resilient members on the disk.

13. The pneumatic tube assembly unit of claim 8 having in addition thereto at least one outwardly disposed rib on the outer periphery of the inflatable tube.

14. The pneumatic tube assembly unit of claim 8 having addition thereto an abrasive section on the outer periphery of the inflatable tube.

15. A hub cap for a vehicle wheel having an inwardly disposed annular surface, such hub cap comprising a disc having therein an access opening, means for locking said disc to said vehicle wheel comprising an outstanding circular collar on the inner surface of the disc, an inflatable tube portion supported on the outstanding circular collar, a valve stem assembly on the inflatable tube portion aligned with the access opening in the disc for pressurizing the inflatable tube portion so as to bring it into a holding engagement with the inwardly disposed annular surface on the vehicle wheel, and means for lockably closing said access opening whereby deflation of said tube portion is required to remove said hub cap from said vehicle wheel.

16. The hub cap as defined in claim 15 wherein said lockable closing means comprises a removable plug in the access opening of the disc adapted to enter into a locking engagement with the disc to prevent unauthorized access to the valve stem assembly on the inflatable tube portion.

17. The hub cap as defined in claim 16 having and further comprising means on the outer periphery of the inflatable tube portion for increasing its holding engagement with the inwardly disposed annular surface on the vehicle wheel.

* * * * *